Oct. 23, 1956  R. W. TACCONE  2,767,445
MOLDING APPARATUS

Filed Aug. 8, 1952  13 Sheets-Sheet 1

INVENTOR.
Russell W. Taccone
BY
HIS ATTORNEYS

Oct. 23, 1956 R. W. TACCONE 2,767,445
MOLDING APPARATUS
Filed Aug. 8, 1952 13 Sheets-Sheet 2

INVENTOR.
Russell W. Taccone
BY
HIS ATTORNEYS

Oct. 23, 1956 — R. W. TACCONE — 2,767,445
MOLDING APPARATUS
Filed Aug. 8, 1952 — 13 Sheets-Sheet 4
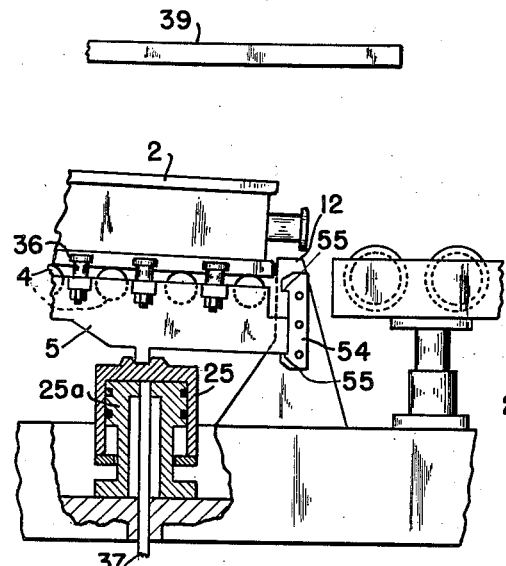
Fig. 13
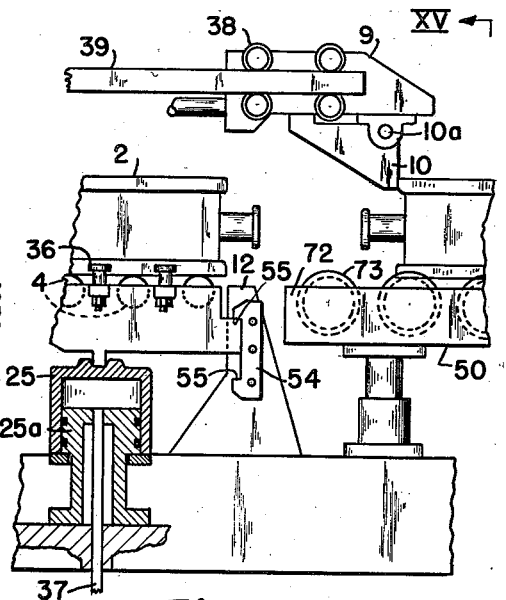
Fig. 14
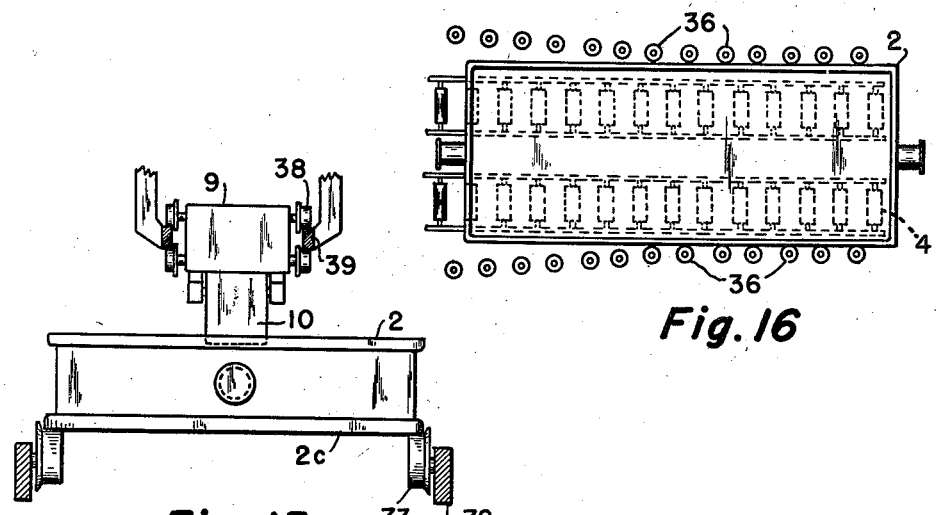
Fig. 15
Fig. 16
INVENTOR.
Russell W. Taccone
BY
HIS ATTORNEYS Oct. 23, 1956  R. W. TACCONE  2,767,445
MOLDING APPARATUS
Filed Aug. 8, 1952  13 Sheets-Sheet 7

*INVENTOR.*
*Russell W. Taccone*
BY
*HIS ATTORNEYS*

INVENTOR.
Russell W. Taccone

BY
HIS ATTORNEYS

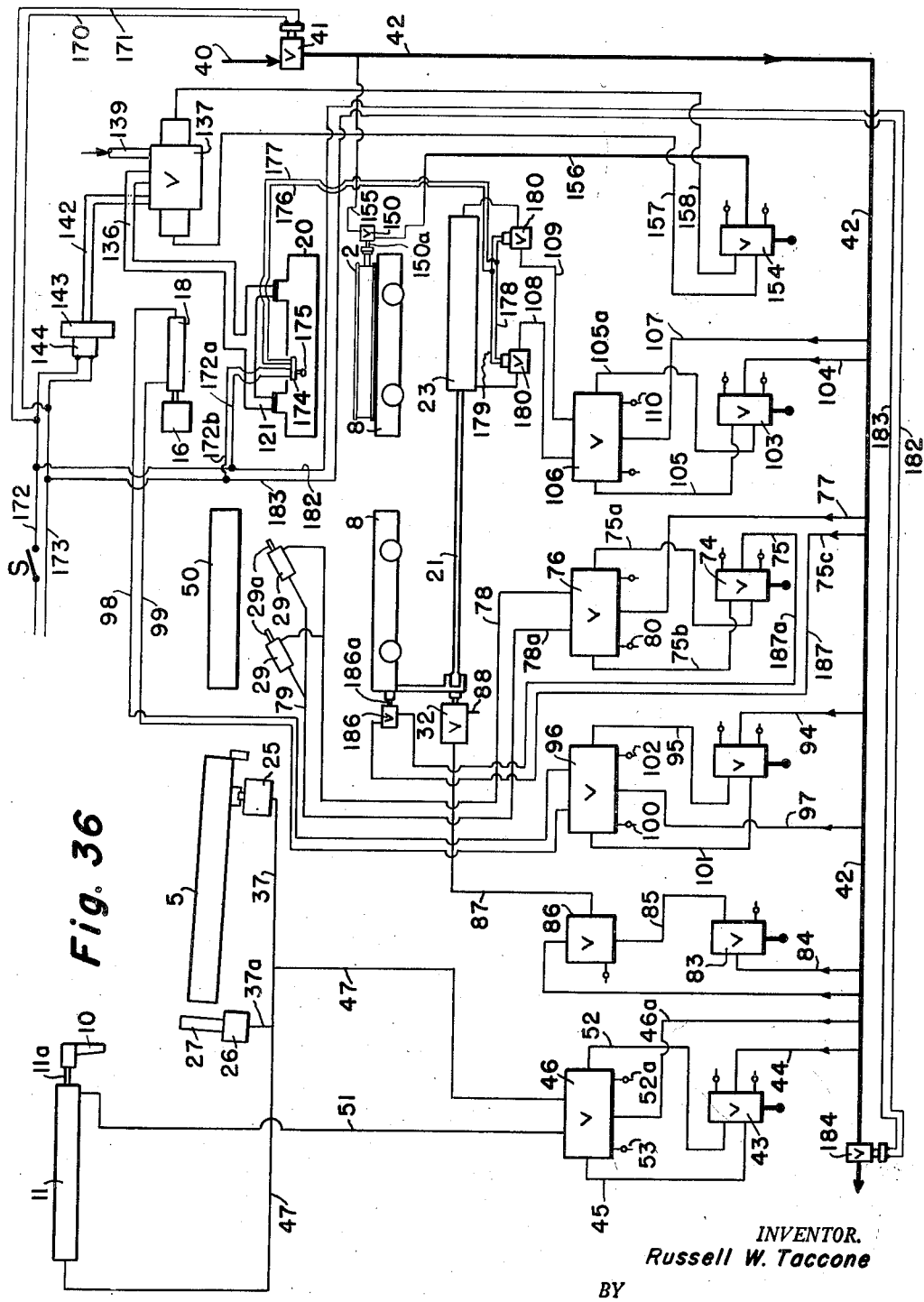

United States Patent Office 2,767,445
Patented Oct. 23, 1956

2,767,445

MOLDING APPARATUS

Russell W. Taccone, Northeast, Pa., assignor to Taccone Pneumatic Foundry Equipment Corporation, Northeast, Pa., a corporation of Pennsylvania Application August 8, 1952, Serial No. 303,313

17 Claims. (Cl. 22—20)

This invention relates to molding apparatus for packing sand in a flask against a pattern to produce a mold, and to associated mechanism. The invention is described herein as applied to making molds for pipes, but it may be used for making molds to produce other articles.

In the accompanying drawings which illustrate a preferred embodiment of my invention, Figures 1–10 are diagrammatic views illustrating successive steps in the use of the apparatus to produce a pipe mold;

Figure 11 shows the tiltable conveyor section in its lowered position, and Figure 12 shows it in its raised position;

Figure 13 is a detailed side elevation illustrating the cylinder for raising and lowering the tiltable conveyor section and showing also stops for limiting horizontal movement of the flask on the tiltable conveyor section and vertical movement of the tiltable conveyor section;

Figure 14 is a detailed side elevation illustrating the mechanism for advancing the flask from the tiltable conveyor section to the flask positioning and stripping device;

Figure 15 is a vertical section taken on the line XV—XV of Figure 14;

Figure 16 is a plan view of the tiltable conveyor section;

Figure 18 shows the device in its raised position, and Figure 19 in its lowered position;

Figure 20:
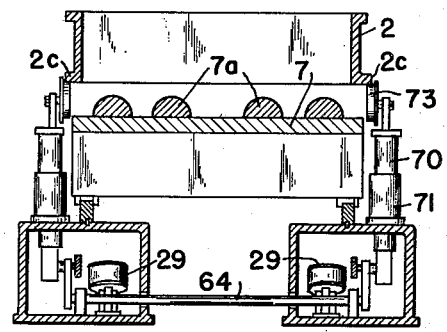
Figure 21:
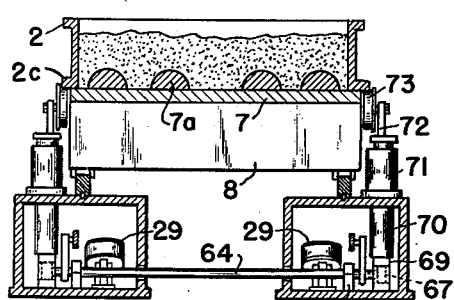
Figure 22:
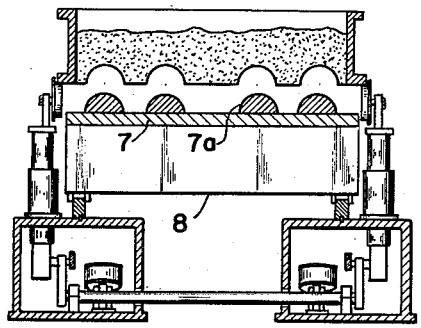
Figures 23, 24:
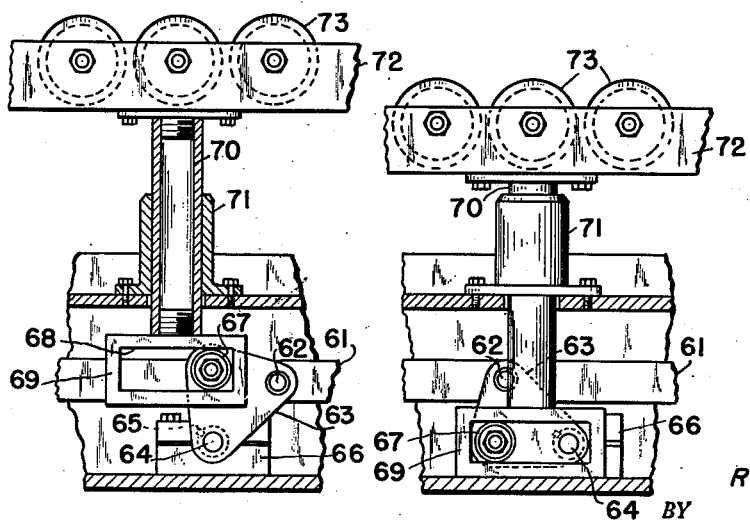
Figure 25:
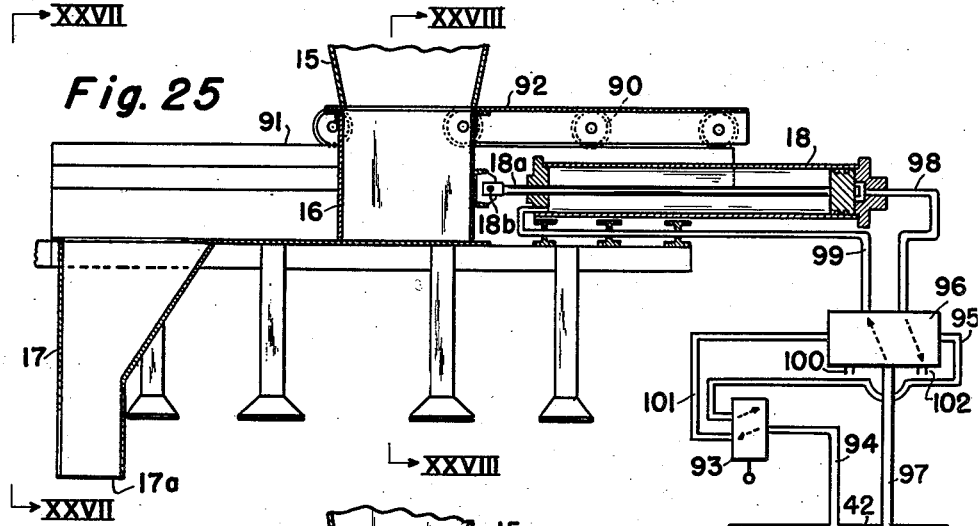
Figure 26:
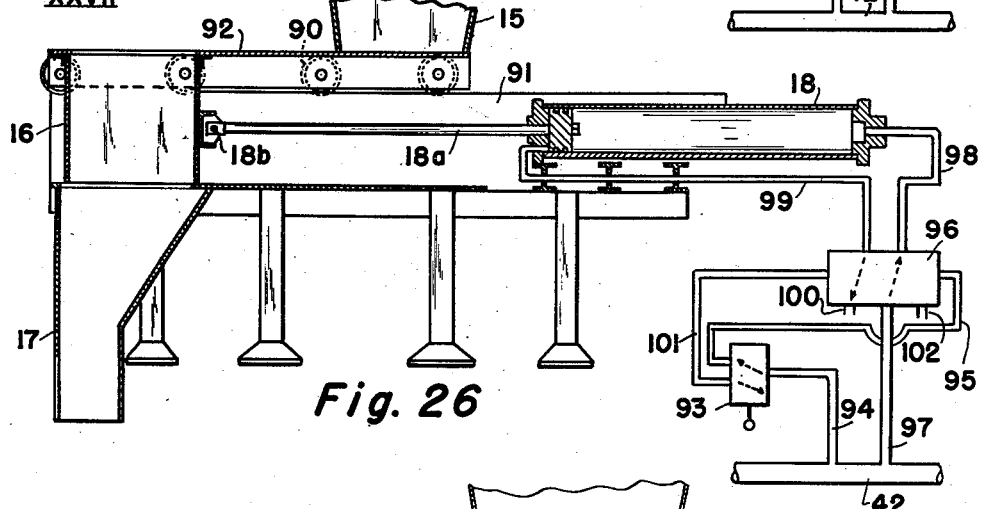
Figure 27:
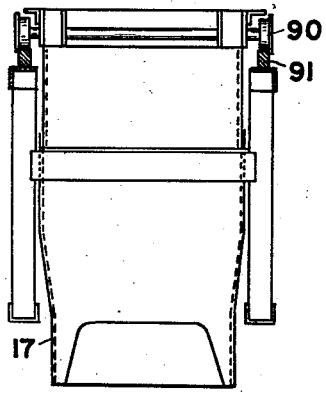
Figure 28:
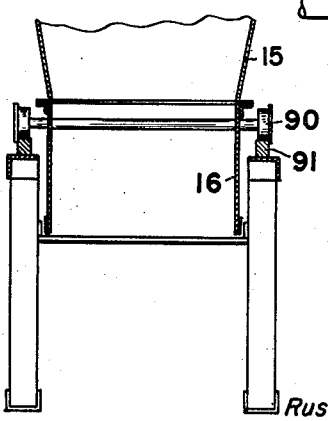
Figure 29:
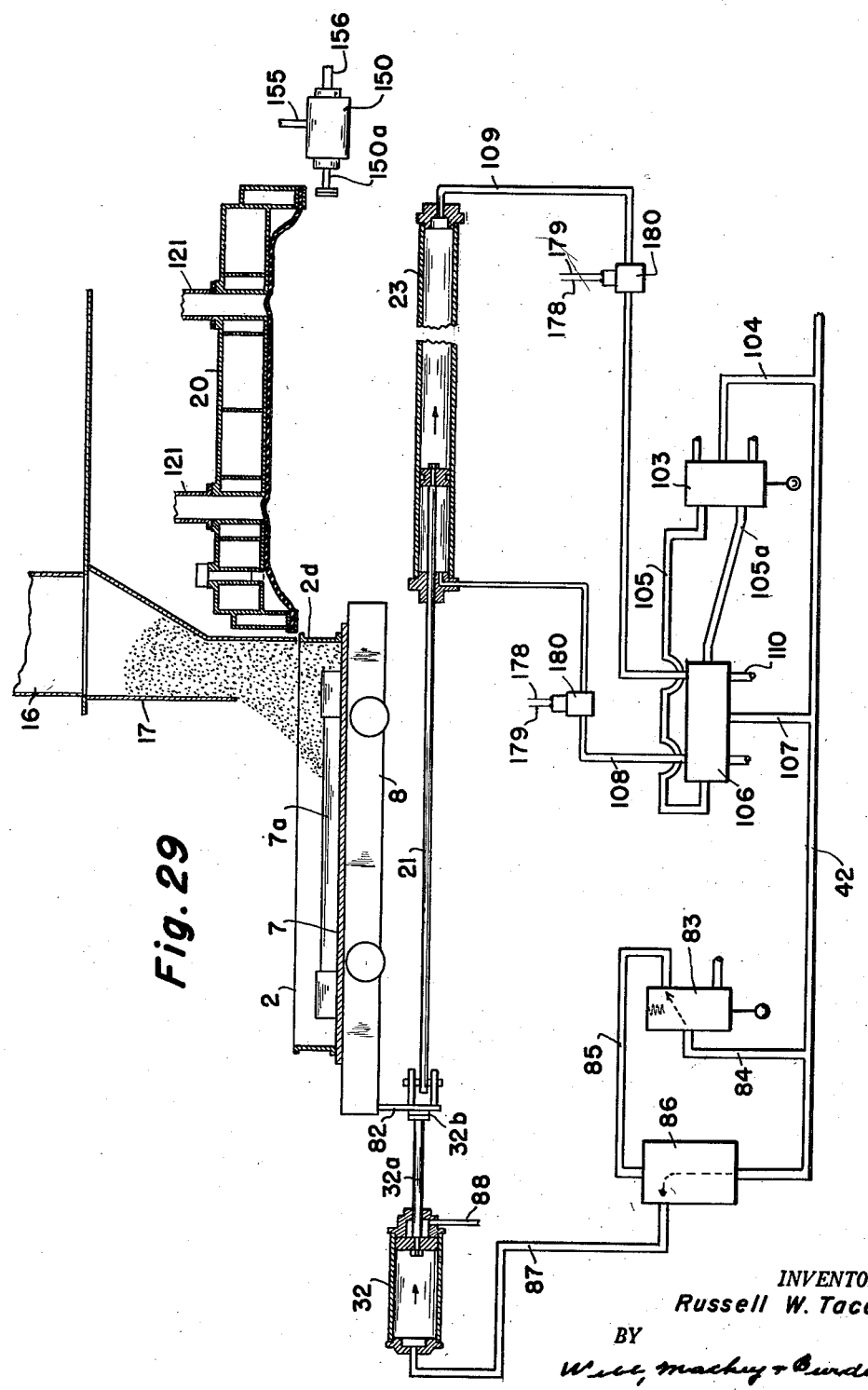
Figure 30:
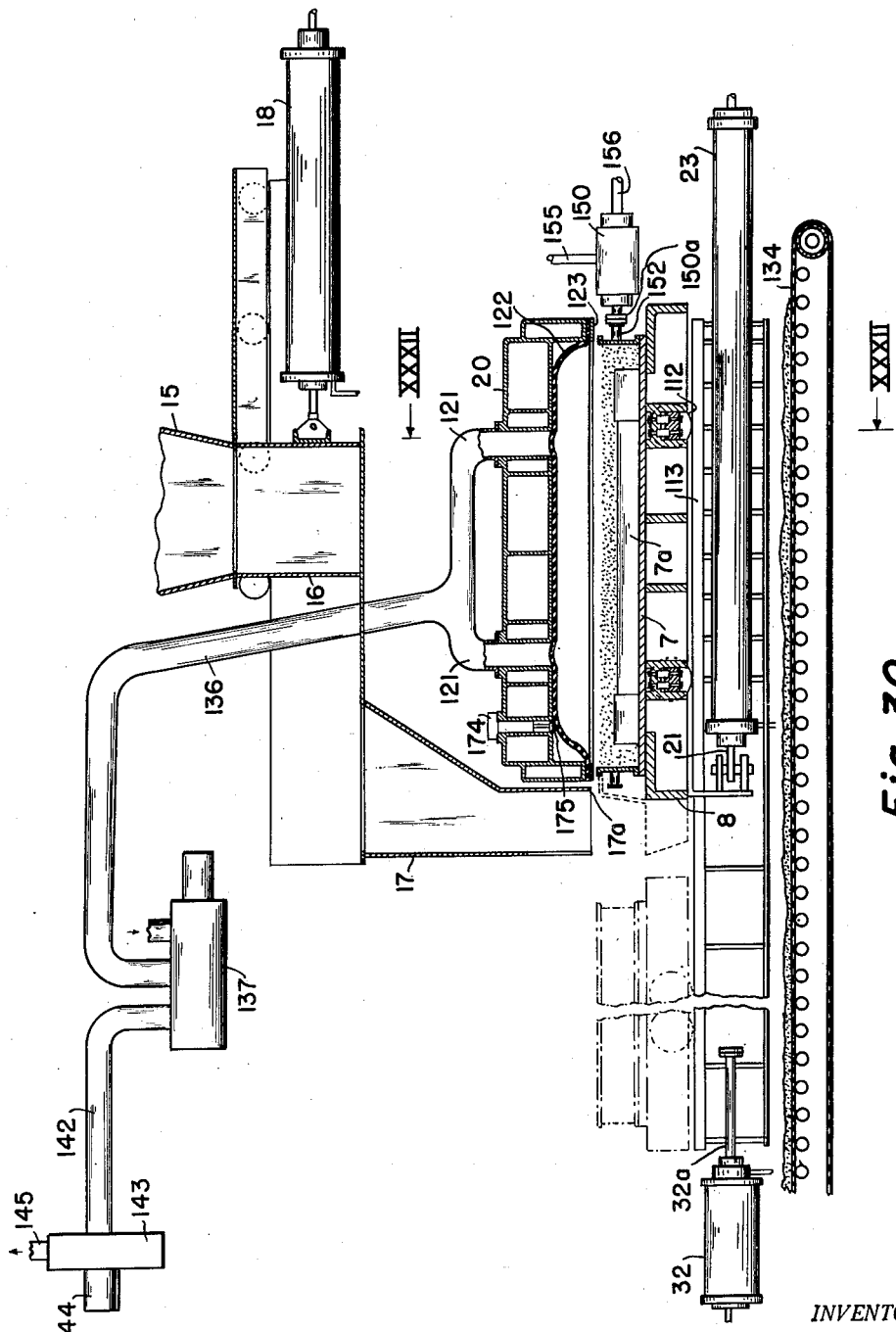
Figure 31:
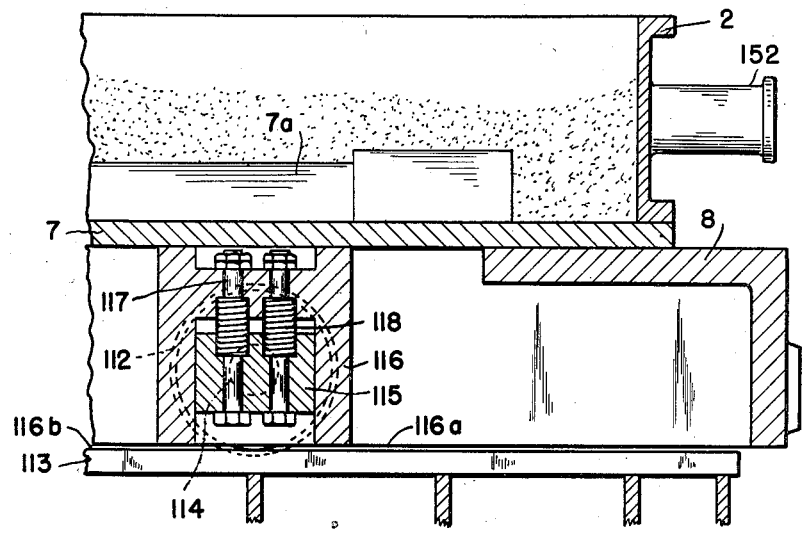
Figure 32:
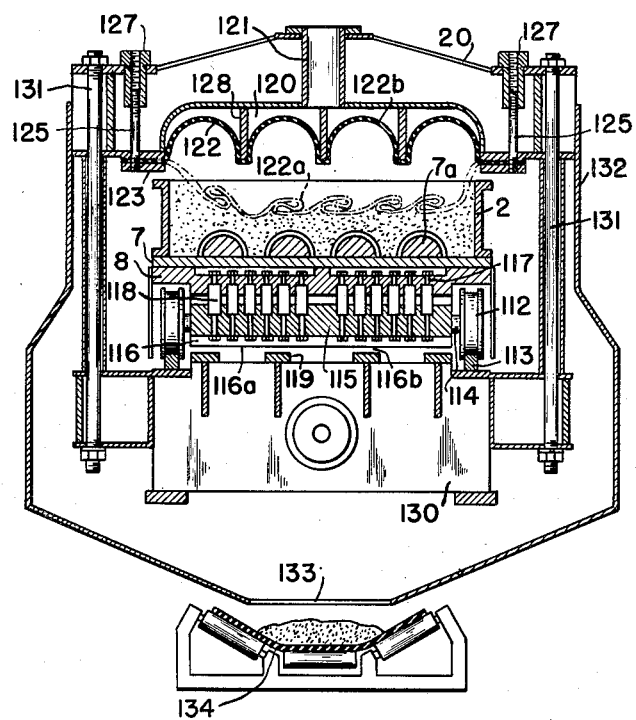
Figure 33:
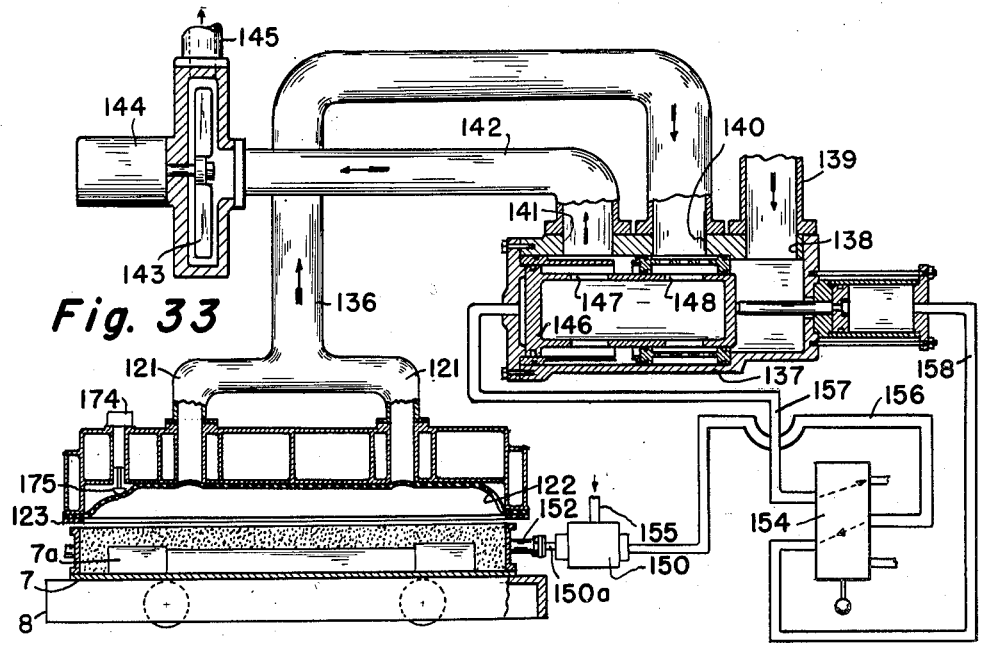
Figure 34:
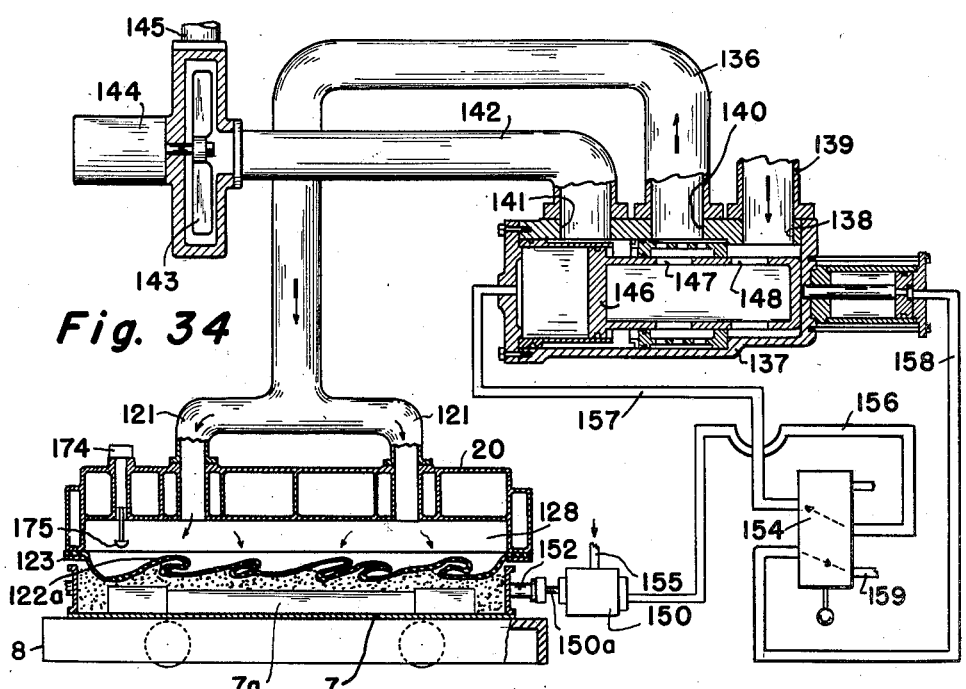
Figure 35:
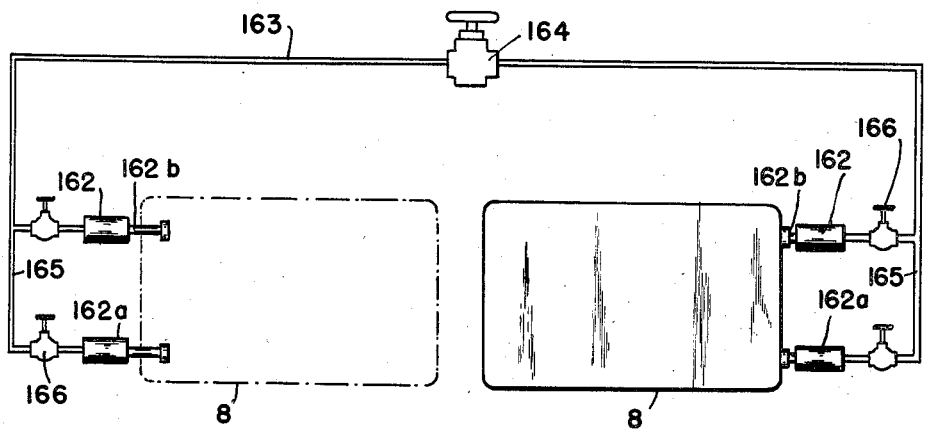
Figure 37:
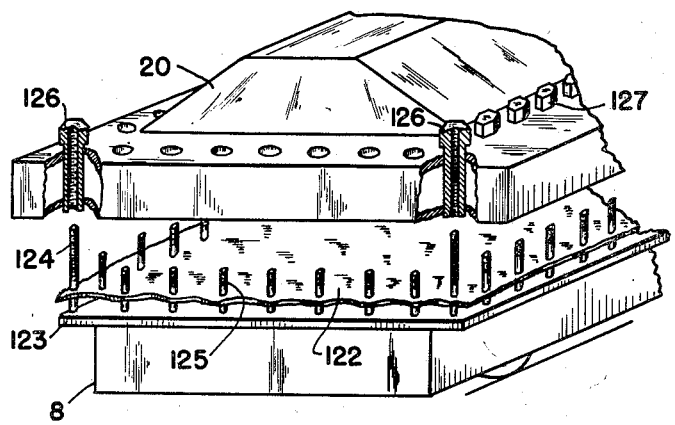

Figures 20, 21 and 22 are vertical transverse sections through the flask and the flask positioning and stripping device, parts being shown in elevation. In Figure 20, the device is in raised position supporting the flask above the pattern plate which rests on a traverse car. In Figure 21, the device has been lowered to lower the flask onto the pattern plate and the flask has been filled with sand. Figure 22 shows the parts after the sand has been compacted to produce a mold and the mold has been stripped from the pattern by raising the device;

Figures 23 and 24 are details of the flask positioning and stripping device, Figure 23 showing it in raised position, and Figure 24 in lowered position;

Figures 25 and 26 are vertical longitudinal sections illustrating the metering box and means for moving it to transfer sand from a position underneath a hopper to a position over a chute for delivering it to the flask;

Figure 27 is an end elevation taken on the line XXVII—XXVII of Figure 25;

Figure 28 is a vertical section taken on the line XXVIII—XXVIII of Figure 25;

Figure 29 is a longitudinal section showing the flask in indexing position underneath the sand chute;

Figure 30 is a longitudinal section showing the flask underneath the press head which is provided with a flexible diaphragm and means for expanding it in order to pack sand against the pattern in the flask;

Figure 31 is a detail illustrating the means for mounting the traverse car frame on its supporting wheels;

Figure 32 is a vertical transverse section taken on the line XXXII—XXXII of Figure 30;

Figures 33 and 34 show the flask underneath the press head and the air exhaust and supply means for respectively withdrawing the flexible diaphragm into the press head and for expanding it to pack sand in the flask. Figure 33 shows the flexible diaphragm withdrawn into the press head, and Figure 34 shows it expanded to pack sand against the pattern plate;

Figure 35 is a diagrammatic illustration of the air cushion means for controlling movement of the traverse car;

Figure 36 is a diagram illustrating the various parts of the apparatus and the air lines for controlling the functioning of the apparatus. It also shows certain electrical connections; and Figure 37 is a perspective view of the press head, flexible diaphragm, diaphragm retaining frame and traverse car, illustrating a rapid means for replacing a flexible diaphragm.

Figure 1:
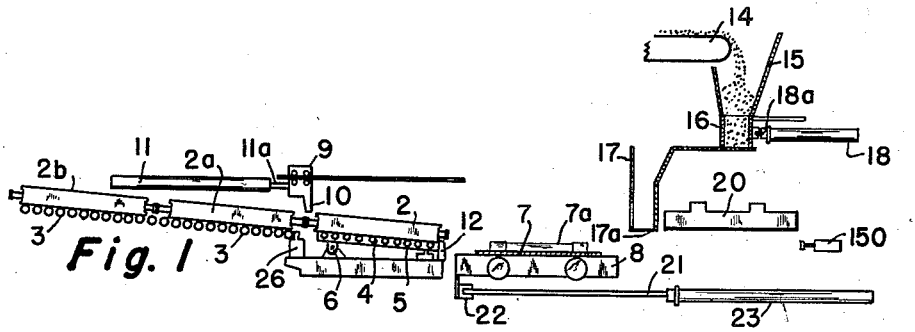
Figure 2:
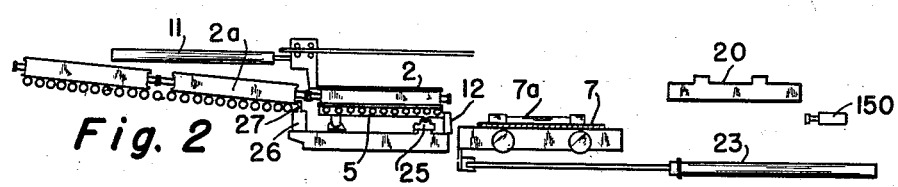

Referring more particularly to the accompanying drawings and particularly to Figures 1–10, in Figure 1, three flasks 2, 2a and 2b are shown. The two flasks 2a and 2b are supported on rollers 3 on a conveyor section which is fixed in position. The flask 2 is shown as supported on rollers 4 of a tiltable conveyor section 5 having its left-hand end pivoted at 6. A pattern plate 7 and pattern 7a are supported on a traverse car 8. A pushing device 9 having a dog 10 adapted to contact the flask 2 to push it from the tiltable conveyor section 5 onto a flask positioning and stripping device which straddles the traverse car 8 is operated by a piston 11a operating in a cylinder 11. The flask positioning and stripping device is shown in Figures 17–24. A stop 12 holds the flask 2 on the tiltable conveyor section 5 in Figure 1.

Sand is supplied from a belt 14 to a hopper 15. The sand flows from the hopper into a metering box 16 by which it is transferred from the hopper to a chute 17. The metering box 16 is moved by a piston 18a operating in a cylinder 18. A press head 20 is provided with a flexible diaphragm and means for connecting the head to a source of compressed air to expand the diaphragm and pack sand against the pattern in the flask. The head 20 also is provided with means for exhausting the air from the head and thereby withdrawing the flexible diaphragm into a cavity in the head. The traverse car 8 is moved by a piston 21 connected to the traverse car at 22 and operating in a cylinder 23. It also is moved by an indexing cylinder 32 and piston 32a as explained later.

The right-hand end of the tiltable conveyor section 5 is raised by operating a cylinder 25 so that the flask 2 extends in a horizontal plane. This raises the flask above the fixed stop 12, and substantially simultaneously therewith a cylinder 26 carrying a stop 27 is operated to raise the stop 27 so as to prevent movement of the flask 2a onto the tiltable conveyor section 5 when the flask 2 is pushed from the conveyor section 5.

Figure 3:
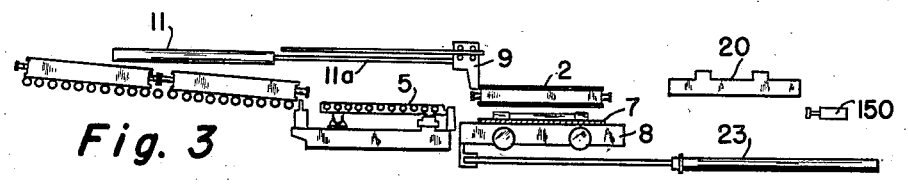

As shown in Figure 3, the piston 11a in cylinder 11 is operated to move the pusher 9 to the right to push the flask 2 off the conveyor section 5 and onto a flask positioning and stripping device which, in its raised position, holds the flask 2 in position above the traverse car 8 supporting the pattern plate 7. The stripping device is shown more particularly in Figures 17–24.

Figure 4:
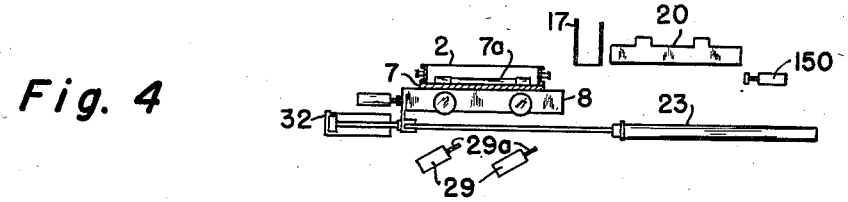

Referring to Figure 4, the flask 2 is then lowered onto the pattern plate 7 on the traverse car 8 by operating pistons 29a in cylinders 29.

Figure 5:
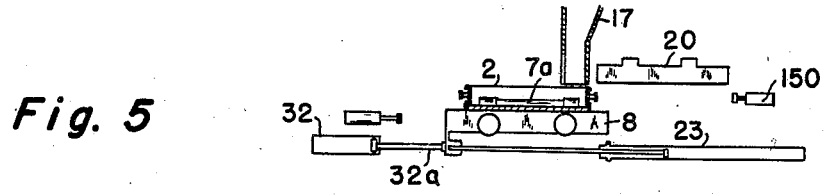

The traverse car carrying the pattern plate and flask is then moved to indexing position as shown in Figure 5 in which the flask 2 is in position to receive sand from the chute 17. This movement to the indexing position is performed by a piston 32a operating in cylinder 32.

Figure 6:
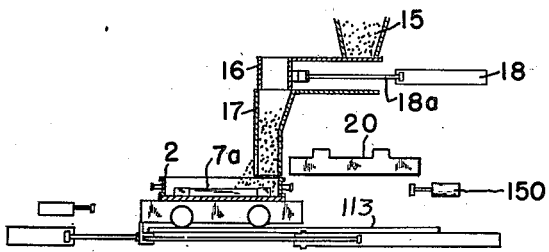

As shown in Figure 6, sand in the hopper 15 is conveyed by the metering box 16 actuated by piston 18a and cylinder 18, to deliver sand into the chute 17 from which it flows into the flask 2.

Figure 7:
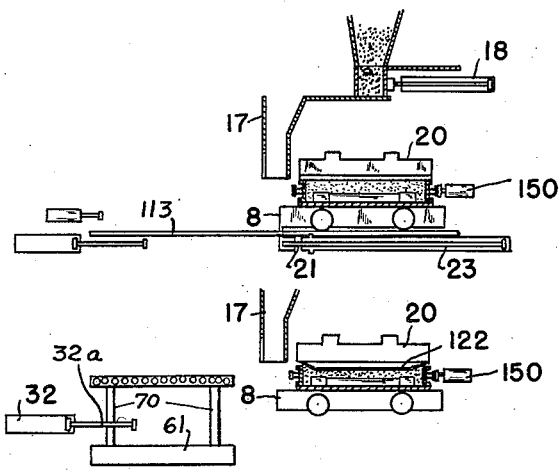

As shown in Figure 7, the traverse car and flask are moved from the indexing position shown in Figure 6 to that shown in Figure 7 in which the flask is located underneath the press head 20. This movement is accomplished by piston 21 and cylinder 23.

Figure 8:
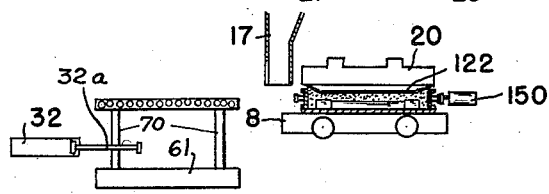

As shown in Figure 8, air under pressure is introduced into the press head 20 to expand the flexible diaphragm 122 and compact the sand against the pattern.

Figure 9:
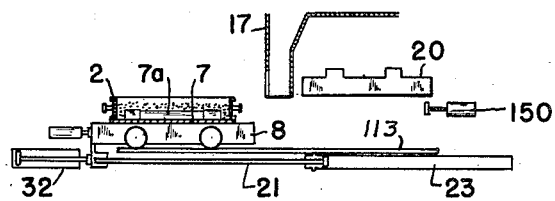

As shown in Figure 9, the traverse car and flask containing the sand mold are then moved to the left to a position adjacent the flask positioning and stripping device by moving piston 21 to the left.

Figure 10:
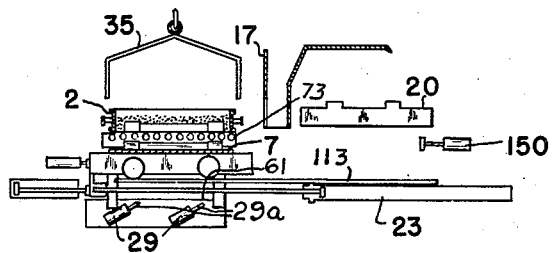

As shown in Figure 10, the pistons 29a are operated in their cylinders 29 to raise the flask positioning and stripping device and thereby strip the flask and its sand mold from the pattern plate 7. Thereafter, the flask containing the sand mold is moved by a crane 35 or other suitable device away from the molding machine.

The construction and operation of the tiltable conveyor section 5 and associated parts are shown in more detail in Figures 11–16. The tiltable conveyor section 5 is pivoted at its left-hand end on a pin 6. It carries rollers 4 for supporting the flask 2, and in addition two converging rows of rollers 36, one on each side of the conveyor section, for properly locating the flask in position as it is delivered from the rollers 3 of the fixed conveyor. A piston 25a operates in cylinder 25 for raising and lowering the conveyor section 5. Air is admitted into the cylinder 25 through a pipe 37 to raise the conveyor section.

The stop 27 is carried by the cylinder 26 in which a piston 26a operates. By introducing air through pipe 37a into the cylinder, the stop 27 is raised.

The dog 10 is pivoted at 10a to the carriage 9 which is provided with wheels 38 running on rails 39.

Figure 11:
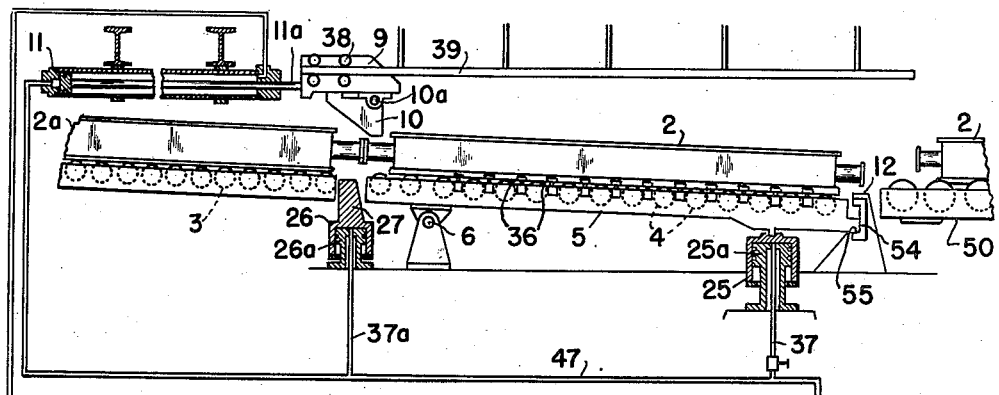
Figures 11 and 12 are side elevations of a tiltable roller conveyor section for conveying flasks from a stationary roller conveyor to a flask positioning and stripping device.
Figure 12:
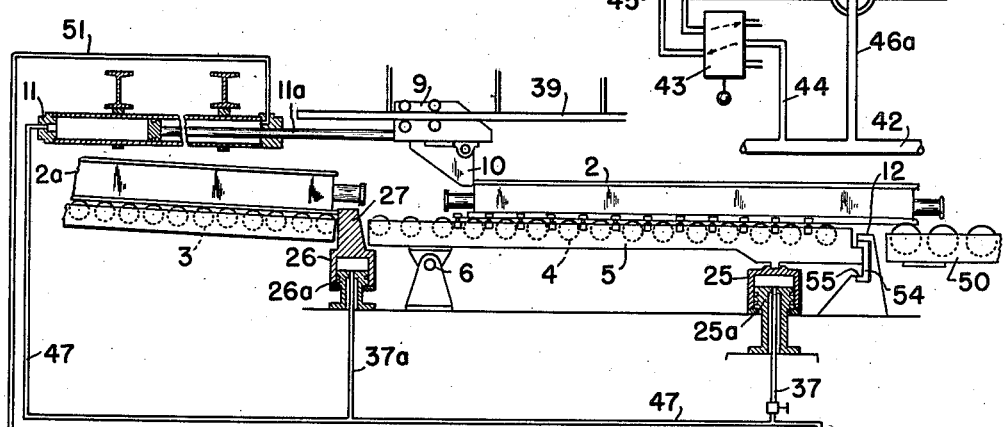
Figure 17:
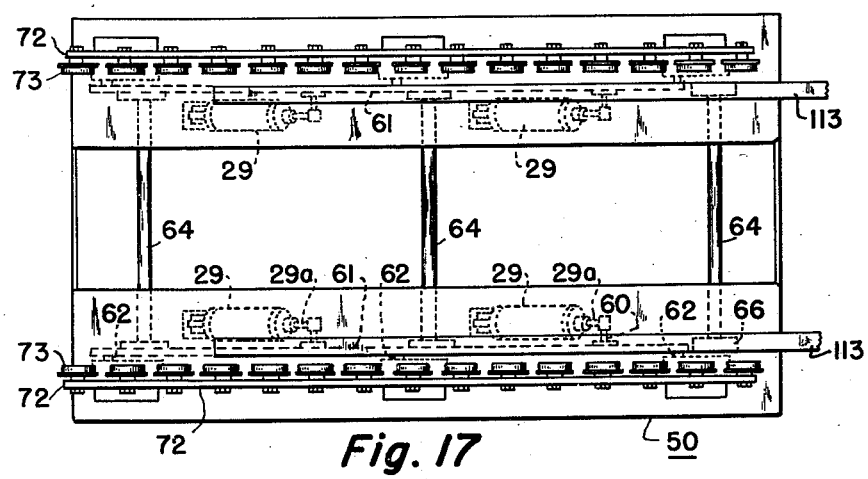
Figures 17, 18 and 19 illustrate the flask positioning and stripping device, Figure 17 being a plan view and Figures 18 and 19 side elevations with parts being shown in section.

Referring to Figures 11, 12 and 36, air under pressure is supplied through a pipe 40, valve 41, and pipe 42, which supplies air to various manually operated valves and various mechanically operated valves for performing the various functions. In order to raise the tiltable conveyor section 5 from the lowered position shown in Figure 11 to the raised position shown in Figure 12, manually operated valve 43 is operated to cause air to flow from pipe 42 through pipe 44, valve 43, pipe 45, and mechanically operated valve 46. This allows air to flow from pipe 42 through pipe 46a through valve 46, pipe 47 and pipe 37 to cylinder 25, thereby raising tiltable conveyor section 5. Air also flows from pipe 47 through pipe 37a into cylinder 26 so as to raise the stop 27. Air also flows from pipe 47 into the left-hand end of cylinder 11, thereby moving piston 11a and dog 10 to the right and pushing flask 2 from the tiltable conveyor section 5 onto a flask positioning and stripping device 50. Air is exhausted from the cylinder 11 through pipe 51, valve 46 and exhaust outlet 52a. The position of valve 43 is then reversed to that shown in Figure 11 whereby air flows from pipe 42 through pipe 44, valve 43 and pipe 52 to operate valve 46 so that air from pipe 42 flows through pipe 46a into valve 46, and from that valve flows through pipe 51 into the right-hand end of cylinder 11, thereby moving piston 11a and dog 10 to the left so that the dog is in a position to advance another flask 2 from the tiltable conveyor section 5 onto the flask positioning and stripping device 50. The exhaust from the left-hand end of cylinder 11 flows through pipe 47 and valve 46 to an exhaust outlet 53. The air in cylinders 25 and 26 is exhausted through the pipes 37 and 37a connected to pipe 47, thereby lowering cylinder 25, tiltable conveyor section 5 and stop 27.

The vertical tilting movement of the right-hand end of conveyor section 5 is limited by a dog 54 having portions 55 extending toward the conveyor section 5.

Referring to Figures 17–24 which illustrate the flask positioning and stripping device 50, four cylinders 29 each having a piston rod 29a are pivoted at 56 to the base of the machine. The outer ends of the piston rods are pivoted to pins 60 extending inwardly from two longitudinally extending tie-rods 61, one tie-rod being located on each side of the device. Each of the tie-rods 61 carries three pins 62 pivoted to three rockers 63. The rockers on opposite sides of the stripping device are rigidly connected in pairs to shafts 64 by keys 65 (see Figure 23), the shafts 64 being rotatably mounted in bearings 66. Each of the rockers 63 carries a cam roller 67 received in an opening 68 in a shoe 69. Each of the shoes is connected to a push rod 70 which slides in a bushing 71. The tops of the push rods 70 are connected to two bars 72, one located on each side of the device 50. These bars carry rollers 73 which extend inwardly of the device, the bars being so spaced that they straddle the traverse car 8 and pattern plate 7 with the rollers in line to contact the lower flanges 2c of the flask 2 which extend outwardly slightly beyond the edges of the pattern plate. The device 50 is shown in raised position in Figures 18 and 23, in which position the flask is held above the traverse car 8. It is shown in lowered position in Figures 19 and 24, in which position the flask rests on the pattern plate which is supported by the traverse car.

Figure 18:
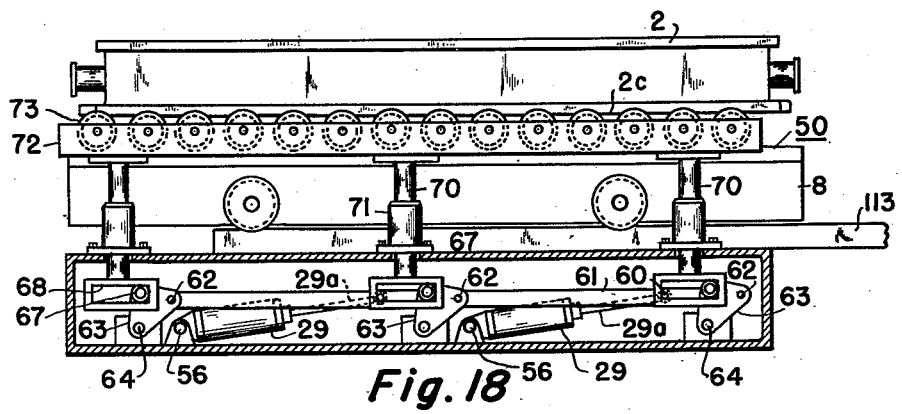
Figure 19:
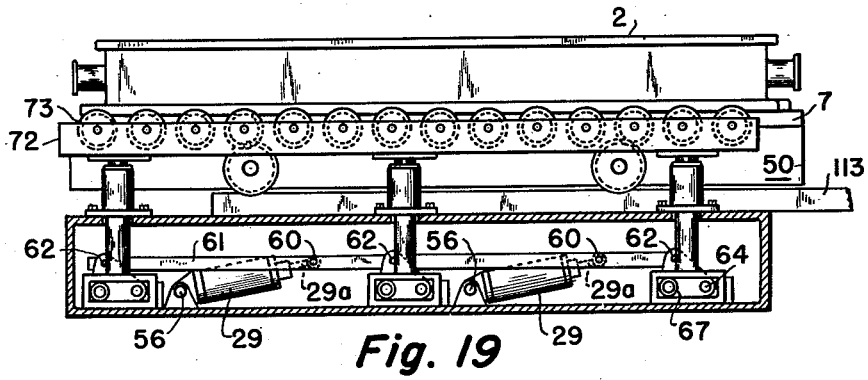

After the flask 2 has been moved onto the flask positioning and stripping device 50 with the device in its raised position as shown in Figure 18, the device is then lowered so that the flask rests on the pattern plate 7. This is done by operating valve 74 so as to cause air to flow from pipe 42 through pipe 75c, pipe 187, valve 186, pipe 187a, pipe 75, valve 74 and pipe 75a, to operate valve 76 so as to allow air to flow from pipe 42 through pipe 77 through valve 76 and pipe 78 to the upper ends of the cylinders 29. The air in the cylinders 29 is exhausted from the lower ends of the cylinders through pipe 79, pipe 78a, valve 76, and exhaust 80. Movement of the piston rods 29a into the cylinders moves the tie-rods 61 to the left as viewed in Figures 18 and 19 and rocks the rockers 63 counterclockwise about their pivots 64 to the position shown in Figure 19. Due to the connection between the rockers 63 and the shoes 69 by means of the cam rollers 67, this lowers the shoes 69 and push rods 70, thereby lowering the bars 72 and rollers 73.

The next operation is to move the traverse car 8 with the pattern plate 7 and flask 2 thereon to the indexing position shown in Figures 5 and 29 in which the front end 2d of the flask is underneath the sand chute 17. This movement is performed by piston 32a and cylinder 32. The piston 32a has a block 32b which contacts a bracket 82 extending down from the traverse car. Spring controlled manually operated valve 83 is operated to allow air to flow from the pipe 42 through pipe 84, valve 83, pipe 85, to open valve 86, thereby causing air to flow from the pipe 42 through valve 86 and pipe 87 to the left-hand end of cylinder 32 as viewed in Figure 29. The air in the cylinder 32 is exhausted through a pipe 88.

Sand is then transferred from the hopper 15 to the chute 17 by a metering box 16. As shown in Figures 25–28, the metering box is supported by wheels 90 running on rails 91. It has a shelf 92 extending in the opposite direction from the chute 17 for cutting off the supply of sand from the hopper 15 when the metering box 16 is moved over the chute. A piston rod 18a operating in cylinder 18 is connected at 18b to the metering box.

Valve 93 is operated to cause air to flow from pipe 42 through pipe 94, valve 93, and pipe 95 to operate valve 96, thereby causing air to flow from pipe 42 through pipe 97, valve 96 and pipe 98 to the right-hand end of cylinder 18. The air is exhausted from the cylinder through pipe 99, valve 96 and exhaust outlet 100.

Valve 93 is then operated to return the metering box 16 to the position shown in Figure 25 in which it is located underneath the hopper 15. Air flows from pipe 42 through pipe 94, valve 93, pipe 101, valve 96, and pipe 99 to the left-hand end of the cylinder 18. Air in the cylinder is exhausted through pipe 98, valve 96, and exhaust outlet 102.

The traverse car 8, pattern plate 7, and flask 2 are then moved to a position underneath the press head 20, as shown in Figures 7, 30, 32 and 36. During this movement, the lower edge 17a of the chute 17 strikes off the sand in the flask and levels it. The air connections for accomplishing this movement also are shown in Figure 29. Valve 103 is operated so that air flows from pipe 42 through pipe 104, valve 103, and pipe 105 to operate valve 106 so that air flows from pipe 42 through pipe 107, valve 106, pipe 108, to the left-hand end of the cylinder 23. Air is exhausted from the cylinder through pipe 109, valve 106 and exhaust outlet 110.

As shown in Figures 30, 31 and 32, the traverse car 8 is supported by wheels 112 running on rails 113. The wheels are supported by journals 114 which are integral with blocks 115 extending transversely of the traverse car and movable upwardly and downwardly in pockets extending transversely of the traverse car and formed by downwardly extending flanges 116 space longitudinally of the car. The blocks 115 are supported from the traverse car by bolts 117 spaced transversely of the car. A spring 118 surrounds each of the bolts and has its upper end fitting in a pocket in the lower side of the traverse car and its lower end fitting in a pocket in the upper side of the block 115. The springs 118 are of such strength that the lower edge 116a of the webs or flanges 116 are spaced by a small space 116b from the base or bed 119 of the machine when the traverse car is being moved from one position to another, the car being supported during this movement by the wheels 112 running on the rails 113. However, when the traverse car with a flask thereon is positioned underneath the press head 20 and pressure is being exerted on the sand by the flexible diaphragm to compact it against the pattern, this high pressure lowers the traverse car so that the edges 116a of the webs 116 rest on the base 119 to provide a firm support and relieve the load from the journals 114.

Referring to Figures 32–34 and 37, the underside of the press head 20 is provided with a cavity 120 connected to two pipes 121 through which air may be admitted to the head or exhausted from the head. A flexible diaphragm 122 made of rubber or other suitable flexible material is connected at its border by a diaphragm retaining frame 123, threaded studs 124 and 125 secured to the diaphragm retaining frame, and take-up nuts 126 and 127 supported by but rotatable in the head 20. The underside of the head is provided with baffles 128 which provide pockets for the flexible diaphragm when it is withdrawn into the head. The flexible diaphragm has a surface area which is substantially greater than the surface area of the flask 2 so that when it is expanded by introducing air under pressure into the head, it lies in folds 122a against the sand. When it is withdrawn into the head, it lies in loops or folds 122b. By employing a diaphragm of this surface area, the diaphragm is relieved of strains when expanded during a molding operation, particularly those strains which would occur at the border of the flexible diaphragm. The loose diaphragm employed according to my invention greatly increases its life.

The head 20 is secured to the base 130 of the press by tie-rods 131. A guard 132 extending along the front and back of the molding machine directs sand which may be expelled from the flask during the pressing operation through an opening 133 at its bottom onto a belt conveyor 134.

The operation of the flexible diaphragm 122 to expand it against the sand in the flask and to withdraw it into the head is shown more particularly in Figures 30, 33, 34 and 36. The two pipes 121 leading to the cavity 120 between the flexible diaphragm and the lower side of the head are connected by a pipe 136 to a valve 137. This valve has an inlet port 138 connected to an inlet pipe 139 for supplying air under pressure to the flexible diaphragm 122 for expanding it. The valve also has a port 140 connected to the pipe 136 leading to the flexible diaphragm. The valve has a port 141 connected to an exhaust pipe 142 leading to an exhaust blower 143 operated by a motor 144 and having an exhaust outlet 145. The valve 137 has a plunger 146 provided with ports 147 and 148. When the plunger is in the left-hand position in the valve cylinder 137 as shown in Figure 33, the diaphragm 122 is withdrawn into the head by the exhaust blower 143, the diaphragm being connected to exhaust through pipe 136, port 140, port 148, port 147, port 141, pipe 142, and blower 143. In this position of the plunger 146, the air supply through pipe 139 is cut off.

When the plunger 146 is moved to the right as shown in Figure 34, the exhaust through pipe 142 and blower 143 is cut off and the diaphragm is expanded to compact sand in the mold against the pattern. The air under pressure entering through pipe 139 flows through ports 148 and 147 and pipes 136 and 121 into the head.

A valve 150 having a plunger 150a is located in position so that the plunger will be contacted by the end of trunnion 152 of flask 2 mounted on the traverse car 8 when the car is in proper position underneath the press head 20. This valve 150 is normally closed, but is opened when its plunger is contacted by the flask. With the valve 150 opened, manually operated valve 154 is operated to admit air from pipe 42 through pipe 155, valve 150, pipe 156, valve 154, pipe 157, to the left-hand end of valve cylinder 137 to move the plunger 146 to the right so as to admit air under pressure from pipe 139 to the diaphragm 122 to expand it. Air is exhausted from the valve cylinder 137 through pipe 158, valve 154, and exhaust outlet 159.

After the diaphragm has been expanded to pack sand in the flask, the valve 154 is turned to the position shown in Figure 33, whereby air from pipe 42 flows through pipe 155, valve 150, pipe 156, valve 154, pipe 158 to the right-hand end of valve cylinder 137. This cuts off the supply of air to the diaphragm and connects the diaphragm with exhaust, and withdraws the diaphragm into the head 20.

The traverse car 8, pattern 7, flask 2, and compacted sand in the mold are then retracted from a position underneath the head 20 to a position adjacent the flask positioning and stripping device 50 to the position shown in Figure 9. This movement is performed by piston rod 21 operating in cylinder 23. Manually operated valve 103 is operated to cause air to flow from pipe 42 through pipe 104, valve 103, pipe 105a, valve 106, pipe 109 to the right-hand end of cylinder 23, thereby moving piston rod 21 and traverse car 8 to the left in line with the flask positioning and stripping device 50.

The flask 2 and compacted sand therein forming the mold are then raised from the pattern plate 7 by operating the flask positioning and stripping device 50 to raise it. The manually operated valve 74 is operated to cause air to flow from pipe 42 through pipes 75c and 187, valve 186, pipe 187a, pipe 75, valve 74, pipe 75b, valve 76, pipe 78a into the lower ends of cylinders 29 thus moving the piston rods 29a and through the mechanism previously described including the rocker 63, raising the bars 72 and wheels 73 to lift or strip the mold from the pattern plate 7. The flask containing the sand mold is then moved out of the way so that a new flask can be moved onto the flask positioning and stripping device from the tiltable conveyor section 5 and thus the operation can be repeated.

Referring to Figure 35, the apparatus is provided with air cushions for cushioning the movement of the traverse car at the ends of its run between the flask positioning and stripping device 50 and the press head 20. There are two cushioning devices 162 adjacent each end of the machine. Each cushioning device comprises a cylinder 162a having a plunger 162b operating therein and adapted to contact an end of the traverse car 8. The cushions 162 at one end are connected to the cushions at the other end by a pipe 163 provided with a pressure regulator 164 to provide a closed circuit between the cushioning devices. The pipes 165 are provided with valves 166 to regulate the cushioning action.

The molding apparatus is provided with several safety devices which prevent the various parts from operating unless the conditions are such as to prevent injury to the parts. From the operation of the machine thus far described, it will be seen that air under pressure is supplied from pipe 40 through valve 41 to pipe 42. Pipe 42 supplies air for operating cylinders 11, 25, 26, 18, 29, 32, 23 and valve 137. Thus, none of those parts can operate unless valve 41 is open. This valve is solenoid operated and is normally closed. It is connected by wires 170 and 171 to wires 172 and 173 provided with switch S and connecting the motor 144, which drives exhaust blower 143, to a source of current. Accordingly, it is only when exhaust blower 143 is running and the flexible diaphragm 122 is withdrawn into the head 20 that any of the parts mentioned can be operated.

An electric switch 174 having a plunger 175 is located in press head 20 in position to be contacted by the flexible diaphragm 122 when the latter is withdrawn into the head by operation of the exhaust fan. Switch 174 is connected by wires 176 and 177 to wires 178 and 179 which are connected to solenoid operated valves 180 which control the flow of air through pipes 108 and 109 to cylinder 23. Valves 180 are normally closed but are opened when switch 174 is closed by the flexible diaphragm. Switch 174 is connected by wires 172a and 172b to wires 182 and 183.

Wires 182 and 183 connect wires 172 and 173 with a normally open, solenoid operated bleed-off valve 184 in pipe 42. When switch 174 is closed, valve 184 is closed but at other times, it is open to bleed off air in the system so that if any of the manually operated valves are accidentally operated, there will not be enough air in the system to operate any of the parts above mentioned.

A further safety feature is that the flexible diaphragm 122 cannot be expanded to pack sand in the flask 2 unless the traverse car 8 and a flask 2 supported thereon are in proper position underneath the head 20. The valve 150 is normally closed, but carries a spring pressed plunger 150a which is contacted by trunnion 152 on the flask when the traverse car is in proper position underneath the squeeze head 20 to open the valve 150, thus allowing air under pressure to flow through pipe 155, valve 150, pipe 156, valve 154, pipe 157, to valve 137, which controls the operation of the flexible diaphragm.

A further safety feature is that the flask positioning and stripping device 50, the operation of which is controlled by cylinders 29, cannot be operated unless the traverse car 8 is in proper position adjacent the device. When the traverse car 8 is in the left-hand position shown in Figure 36, it contacts a plunger 186a of valve 186 to open this valve which normally is closed. Air then flows from pipe 42 through pipe 75c, pipe 187, valve 186, pipe 187a, pipe 75, to valve 74 and then, as previously described, air flows from pipe 42 through pipe 77, valve 76, and either pipe 78 or pipe 78a to operate the cylinders 29.

Figures 32 and 37 illustrate a rapid means for securing a flexible diaphragm 122 to the press head 20. The diaphragm retaining frame 123 having upwardly extending screw threaded studs 124 and 125 secured thereto is placed on the traverse car 8 while the traverse car is not under the press head 20, and while it is in such position that the diaphragm retaining frame can be conveniently placed on the traverse car. The diaphragm retaining frame is placed directly on the traverse car after having removed the pattern plate 7. The flexible diaphragm is then properly located on the frame by slipping the diaphragm over the studs 124 and 125, the diaphragm having previously been provided with suitable holes. The traverse car is then moved into position under the press head 20. Long take-up nuts 126, one of which is located at each corner of the press head, are then turned to draw the flexible diaphragm and its retaining frame 123 up into contact with the head. Thereafter, take-up nuts 127 which cooperate with studs 125 are turned to draw the diaphragm retaining frame and diaphragm into tight engagement with the head 20.

The invention is not limited to the preferred embodiment, but may be otherwise embodied or practiced within the scope of the following claims.

I claim:

1. A device for stripping a flask and mold contained therein from a pattern plate supported on a support, comprising bars located alongside the support for the pattern plate, rollers secured to the bars and adapted to contact a flange on the flask, lifting rods connected to said bars, shoes having openings therein connected to said lifting rods, rockers pivoted to the support at one end thereof and to said lifting rods at the other end thereof, tie-rods pivoted to said rockers, cylinder and piston means for operating said tie-rods to rock said rockers, and cam rollers carried by said rockers and received in the openings in said shoes.

2. A device according to claim 1, wherein the rockers are spaced along opposite sides of the device and arranged in pairs, each rocker of a pair being rigidly secured to a shaft extending across the device so that the rockers rock in unison.

3. Apparatus for handling flasks, which comprises a stationary inclined conveyor section and a tiltable conveyor section and a traverse car in line with each other, said traverse car being supported for horizontal movement and being adapted to support a pattern plate, a flask positioning and stripping device straddling said traverse car, means for tilting said tiltable conveyor section from an inclined position in which it is adapted to receive a flask from said stationary conveyor section to a horizontal position in which it is adapted to deliver a flask to said flask positioning and stripping device, means for raising and lowering said flask positioning and stripping device relative to said traverse car, means for pushing a flask from said tiltable conveyor section onto said flask positioning and stripping device when the latter is in raised position, a flask stop located between said tiltable conveyor section and said stripping device, a second flask stop located between said stationary and tiltable conveyor sections, and means for raising and lowering said second flask stop to respectively prevent and allow movement of a flask from said stationary inclined conveyor section onto said tiltable conveyor section.

4. Apparatus for handling flasks, which comprises a stationary inclined conveyor section and a tiltable conveyor section and a traverse car in line with each other, said traverse car being supported for horizontal movement and being adapted to support a pattern plate, a flask positioning and stripping device straddling said traverse car, means including a cylinder and piston for tilting said tiltable conveyor section from an inclined position in which it is adapted to receive a flask from said stationary conveyor section to a horizontal position in which it is adapted to deliver a flask to said flask positioning and stripping device, means including a cylinder and piston for pushing a flask from said tiltable conveyor section onto said flask positioning and stripping device when the latter is in raised position, a flask stop located between said tiltable conveyor section and said stripping device, a second flask stop located between said stationary and tiltable conveyor sections, and means including a cylinder and piston for raising and lowering said second flask stop to respectively prevent and allow movement of a flask from said stationary inclined conveyor section onto said tiltable conveyor section.

5. Molding apparatus comprising a support for a pattern plate and flask mounted thereon, a press head located above the support and provided with a cavity, a flexible diaphragm secured at its border to the underside of the head and adapted when expanded to pack sand in the flask against the pattern plate and to be withdrawn into the cavity in said press head, a port in the head leading to the cavity, a valve, a first pipe connecting said port and said valve, an exhaust fan, an exhaust pipe connecting said exhaust fan and said valve, a second pipe for supplying compressed air to said valve, a plunger in said valve, means for moving said plunger to one position to connect said first pipe with said exhaust pipe, thereby rapidly withdrawing said flexible diaphragm into said head, and means for moving said plunger to another position to connect said first pipe with said second pipe, thereby expanding said flexible diaphragm to pack sand in the flask.

6. Molding apparatus comprising a frame, a flask positioning and stripping device supported on said frame, a traverse car supported on said frame and adapted to support a pattern plate, means for lowering the flask positioning and stripping device to deposit a flask carried thereby onto a pattern plate supported on said traverse car, a press having a support for the traverse car and a press head, a chute located between said flask positioning and stripping device and said press for delivering sand to the flask, a sand hopper supported on said molding apparatus above said chute, means for moving the traverse car with a pattern plate and flask mounted thereon to indexing position underneath the chute, a metering box, means for moving the metering box from a position underneath the sand hopper to a position over the chute, means for moving the traverse car from indexing position to a position on the press support underneath the press head, means for operating the press head to pack sand against the pattern plate in the flask to form a mold, means for moving the traverse car with the pattern plate and mold and flask to a position above the flask positioning and stripping device, and means for raising said device to strip the flask and mold from the pattern plate.

7. Molding apparatus comprising a frame, a flask positioning and stripping device supported on said frame, a traverse car supported on said frame and adapted to support a pattern plate, means for lowering the flask positioning and stripping device to deposit a flask carried thereby onto a pattern plate supported on said traverse car, a press having a support for the traverse car, a press head immovable relative to the support and provided with a cavity, a flexible diaphragm secured to the underside of the head and closing the cavity, a chute located between said flask positioning and stripping device and said press for delivering sand to the flask, a sand hopper supported on said molding apparatus above said chute, means for moving the traverse car with a pattern plate and flask mounted thereon to indexing position underneath the chute, a metering box, means for moving the metering box from a position underneath the sand hopper to a position over the chute, means for moving the traverse car from indexing position to a position on the press support underneath the press head, means for introducing air under pressure into the press head to expand the flexible diaphragm and pack the sand in the flask against the pattern plate to form a mold, means for exhausing air from the press head to withdraw the flexible diaphragm into the cavity in the head, means for moving the traverse car with the pattern plate and mold and flask to a position above the flask positioning and stripping device, and means for raising said device to strip the flask and mold from the pattern plate.

8. Molding apparatus comprising a frame, a traverse car supported on said frame and adapted to support a pattern plate and flask, means for supplying sand to the flask on said traverse car, a press having a support for the traverse car, a press head provided with a cavity, a flexible diaphragm secured to the underside of the head and closing the cavity, means for moving the traverse car underneath the press head, means for introducing air under pressure into the press head to expand the flexible diaphragm and pack sand in the flask against the pattern plate, and means for exhausting air from the press head to withdraw the flexible diaphragm into the cavity in the head, said means for introducing air under pressure into the press head including a valve is normally closed, said valve being adapted to be opened by contact with a flask on said traverse car when said car is in proper position underneath the press head.

9. Molding apparatus comprising a frame, a traverse car supported on said frame and adapted to support a pattern plate and flask, a flask positioning and stripping device adapted to be lowered to transfer a flask from said device to said traverse car and adapted to be raised to strip a flask from said pattern plate, cylinder and piston means for actuating said device, means for supplying air under pressure to said cylinder and piston means, a press means located between said flask positioning and stripping device and said press for supplying sand to a flask on said traverse car, means for moving said traverse car between said flask positioning and stripping device and said press, and means for actuating said press to pack sand in the flask against the pattern plate, said means for supplying air under pressure to said cylinder and piston means to actuate said flask positioning and stripping device including a valve which is normally closed, said valve being adapted to be opened by contact with said traverse car when said car is in proper position over said flask positioning and stripping device.

10. Molding apparatus comprising a frame, a traverse car supported on said frame and adapted to support a pattern plate and flask thereon, a press head, a traverse car actuating means for moving the traverse car between a flask loading position and a position underneath the press head, means for supplying sand to the flask on the traverse car while the latter is located between its flask loading position and said press head, said press head being provided with a cavity, a flexible diaphragm secured at its border to the underside of the press head and adapted when expanded to pack sand in the flask against the pattern plate and to be withdrawn into the cavity in said press head, an exhaust fan connected by a conduit to said press head, an electric motor for driving said exhaust fan, means for introducing air under pressure into said press head to expand said flexible diaphragm, an electric switch positioned in said press head and adapted to be closed upon contact with said flexible diaphragm when the latter is withdrawn into said press head, said switch being connected in an electric circuit with the electric motor for said exhaust fan and with said traverse car actuating means.

11. Molding apparatus comprising a frame, a traverse car supported on said frame and adapted to support a pattern plate and flask thereon, a press head, a cylinder and piston for moving the traverse car between a flask loading position and a position underneath the press head, a conduit connecting said cylinder with a source of air under pressure, means for supplying sand to the flask on the traverse car while the latter is located between its flask loading position and said press head, a valve in said conduit, said press head being provided with a cavity, a flexible diaphragm secured at its border to the underside of the press head and adapted when expanded to pack sand in the flask against the pattern plate and to be withdrawn into the cavity in said press head, an exhaust fan connected by a conduit to said press head, an electric motor for driving said exhaust fan, means for introducing air under pressure into said press head to expand said flexible diaphragm, an electric switch positioned in said press head and adapted to be closed upon contact with said flexible diaphragm when the latter is withdrawn into said press head, said switch being connected in an electric circuit with the electric motor for said exhaust fan and with said valve to open said valve when said exhaust fan is operating.

12. Molding apparatus comprising a flask positioning and stripping device located at a first station, a traverse car adapted to support a pattern plate and flask thereon, a press for compacting sand against a pattern plate in the flask, said press being located at a second station adjacent said first station, rails extending between said two stations for supporting the traverse car, and cylinder and piston means for moving said traverse car between said two stations to position the traverse car under said flask positioning and stripping device where said flask and sand therein are stripped from said pattern plate and under said press where said sand is compacted.

13. Molding apparatus comprising a traverse car adapted to support a pattern plate and flask thereon, a flask positioning and stripping device located at a first station and adapted to position a flask on a pattern plate and to strip it therefrom, a press located at a second station adjacent said first station for compacting sand against a pattern plate in the flask, a chute for delivering sand into said flask, said chute being located between said flask positioning and stripping device and said press, and means including rails for the traverse car to move on extending from a position below said flask positioning and stripping device to a position below said press for moving said traverse car and flask mounted thereon from said flask positioning and stripping device to indexing position under said chute for the flask to receive sand from said chute and for thereafter moving and traverse car and flask mounted thereon from indexing position to a position under said press.

14. Molding apparatus comprising a traverse car adapted to support a pattern plate and flask thereon, a flask positioning and stripping device located at a first station and adapted to position a flask on a pattern plate and to strip it therefrom, a press located at a second station adjacent said first station for compacting sand against a pattern plate in the flask, a chute for delivering sand to said flask, said chute being located between said flask positioning and stripping device and said press, a sand hopper supported on said molding apparatus above said chute, a metering box for sand, means for moving said metering box between said sand hopper and said chute, and means including rails for the traverse car to move on extending from a position below said flask positioning and stripping device to a position below said press for moving said traverse car and flask mounted thereon from said flask positioning and stripping device to indexing position under said chute for the flask to receive sand from said chute and for thereafter moving said traverse car and flask mounted thereon from indexing position to a position under said press.

15. Molding apparatus comprising a traverse car adapted to support a pattern plate and flask thereon, a flask positioning and stripping device located at a first station and adapted to position a flask on a pattern plate and to strip it therefrom, a press located at a second station adjacent said first station for compacting sand against a pattern plate in the flask, rails for the traverse car extending from a position below said flask positioning and stripping device to a position below said press, a chute for delivering sand into said flask, said chute being located between said flask positioning and stripping device and said press a sand hopper supported on said molding apparatus above said chute, a metering box for sand, a first cylinder and piston means for moving said traverse car and flask mounted thereon from said flask positioning and stripping device to indexing position under said chute for the flask to receive sand from said chute, a second cylinder and piston means for moving said metering box between said sand hopper and said chute, and a third cylinder and piston means for thereafter moving said traverse car and flask mounted thereon from indexing position to a position under said press.

16. Molding apparatus according to claim 15, wherein the piston of said first cylinder and piston means abuts but is free to move relative to said traverse car and wherein the piston of said third cylinder and piston means is positively connected to said traverse car.

17. Molding apparatus comprising a frame, a traverse car supported on said frame and adapted to support a pattern plate and flask thereon, a flask positioning and stripping device, a press located adjacent said flask positioning and stripping device, means for supplying sand to the flask on the traverse car while the latter is located outside of said press, means for moving said traverse car between said flask positioning and stripping device and said press, cylinder and piston air cushion stop means located adjacent said flask positioning and stripping device and said press to cushion the stopping of said traverse car, and an air conduit forming a closed system connecting said cylinder and piston air cushion stop means.

References Cited in the file of this patent

UNITED STATES PATENTS

| | | |
|---|---|---|
| 302,349 | Moore | July 22, 1884 |
| 318,784 | Moore | May 26, 1885 |
| 360,119 | Stevens | Mar. 29, 1887 |
| 387,716 | Harkins | Aug. 14, 1888 |
| 706,487 | Battenfeld | Aug. 5, 1902 |
| 720,690 | Hammer | Feb. 17, 1903 |
| 1,027,115 | Fahnestock | May 21, 1912 |
| 1,360,147 | Ringle | Nov. 23, 1920 |
| 1,656,951 | Nicholls | Jan. 24, 1928 |
| 1,911,106 | Camerota | May 23, 1933 |
| 2,161,190 | Paull | June 6, 1939 |
| 2,349,219 | Wood | May 16, 1944 |
| 2,588,669 | Taccone | Mar. 11, 1952 |

FOREIGN PATENTS

| | | |
|---|---|---|
| 323,380 | Germany | July 21, 1920 |
| 744,959 | France | Jan. 31, 1933 |